Feb. 23, 1926.
W. M. R. KAY
ELECTRIC WATER HEATER
Filed Feb. 12, 1925
1,574,581
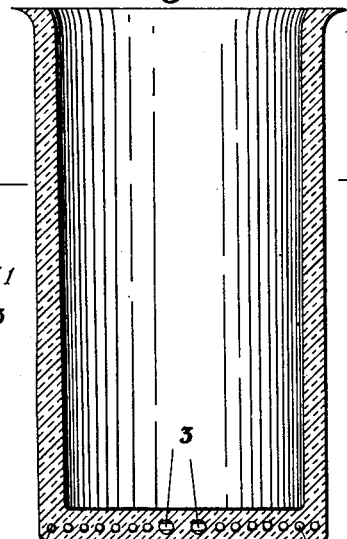
Fig. 2.
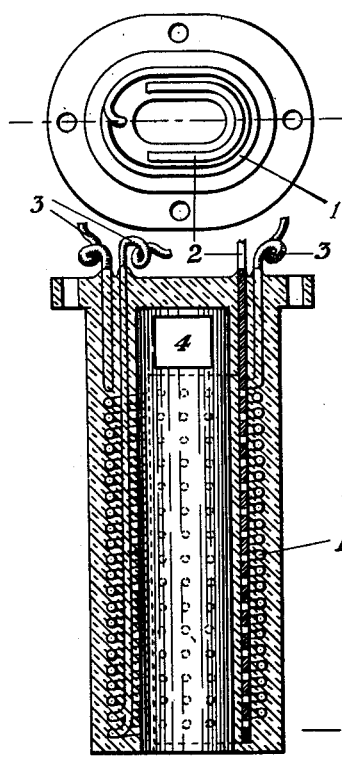
Fig. 5.
Fig. 1.
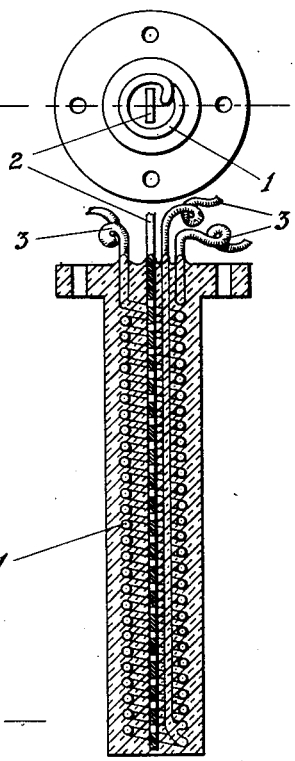
Fig. 7.
Fig. 3.
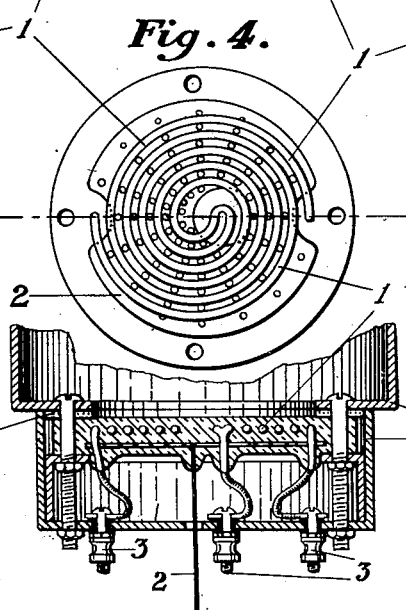
Fig. 4.
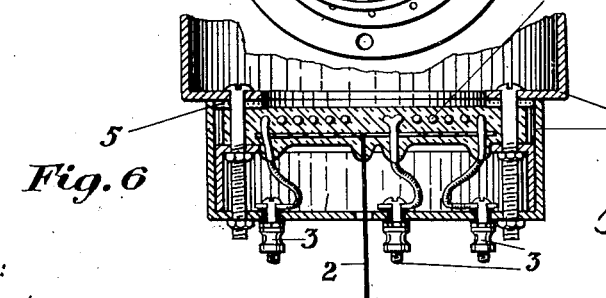
Fig. 6.
WITNESSES:
Albert D. Wells.
J. Freda Smiley
Wm. M. R. Kay.
INVENTOR Patented Feb. 23, 1926.

1,574,581

UNITED STATES PATENT OFFICE.

WILLIAM MAHLON REID KAY, OF WINDSOR, ONTARIO, CANADA.

ELECTRIC WATER HEATER.

Application filed February 12, 1925. Serial No. 8,765.

*To all whom it may concern:*

Be it known that I, WILLIAM MAHLON REID KAY, a British subject, residing at 81 Cameron Ave., in the city of Windsor, in the county of Essex and Province of Ontario, Dominion of Canada, having invented certain new and useful Improvements in Electric Water Heaters, do hereby declare that the following is a full, clear, and exact description of the same.

My invention relates to improvements in a machine for heating liquids and can be adapted to domestic, laboratory or medical use, and the chief object of my invention is to provide an electric heater impervious to water, acids and the like, also to provide said heater with a heating element or unit to burn at a black heat and free from oxidation, also to provide a protection for the heater from overheating, second, to provide an electric heater to heat water, acids and the like most economically by means of the arrangement of the non-conducting, non-absorbing material and the heating unit or element, the said element being designed so as to give the greatest amount of heating surface to the said non-absorbing, non-conducting material, and, third, to provide an electric heater simple, economical and inexpensive of construction.

I attain these objects by the mechanism illustrated in the accompanying drawings, in which—

Fig. 1 shows a plan view of the electric heater in the form of a tube while Fig. 5 shows a sectional elevation of the same.

Fig. 2 shows a sectional elevation of the heater in the form of an open vessel.

Fig. 3 shows a plan view of the electric heater in the form of a rod and Fig. 7 is a sectional elevation of the same.

Fig. 4 shows a sectional elevation of the electric heater in the form of a disk or plate while a plan view of the same is shown in Fig. 6.

Similar numerals refer to similar parts throughout the several views.

Referring to the drawings—

1 represents the heating element or unit, 2 the perforated piece of metal for mounting the circuit-breaker or cut-out, 3 the ends or terminals of the heating elements, 4 is an opening in the tube to allow the water to flow through the tube, 5 a rubber washer or gasket inserted between the flange of the heater and the casing or support, 6 the metal casing and support to which the heater is secured by means of bolts and nuts.

Referring more closely to the several views it will be seen that a heating unit in the form of a round or ribbon wire is imbedded in a non-conducting material which may be of glass or porcelain and since neither of these materials will absorb any of the liquids in which they are submerged, these same non-absorbing materials will not then require any metallic covering.

The ends of the heating element are made to extend through this material and for this reason serve as connections or terminals.

These heating units help to strengthen the material in which they are imbedded but a further reinforcement is provided and accomplished by using a perforated sheet of copper, since the holes allow the molten material to squeeze through the same and grip the sheet of copper more strongly. One end of this copper strip also protrudes through the material.

Besides providing a reinforcement to the above material this perforated sheet of copper maintains internal and external molecular equilibrium in the material when the same expands and contracts, owing to its protruding end conducting the internal heat to the surrounding air outside.

Connected to the end of this perforated metal strip that protrudes through the material is a protective device known as a cut-out, circuit-breaker or thermostatic switch. Its purpose is to immediately stop or disconnect the flow of electricity to the heating element when the contents of the heater boil dry and for this reason prevents the same from becoming burnt out.

The above material may be molded into any of the shapes shown but in each case the same principle of heating and protection is carried out.

It will be seen that Figs. 5, 6 and 7 are each provided with a flanged base having holes in the same which allows the heater to be mounted to the casing or support by means of bolts and nuts as shown in Fig. 4.

The rubber gasket or washer shown in Fig. 4 is used in making a water tight connection between the flange of the heater and the casing.

In Fig. 2 the elements are shown imbedded in the bottom of the vessel and have the ends or terminals protruding through the side. The same principle of protection and reinforcement by means of the perforated sheet of copper is also employed in Fig. 2 although the same has been omitted.

Since the terminals in this case protrude through the side of the vessel the same may also be heated by an oil or gas flame. This feature of combination heating can be used in percolators, tea-pots and the like, also graduate measures and test tubes for medical and laboratory analysis.

I am aware that prior to my invention electric water heaters of the immersion type have been made. I therefore do not claim such a combination broadly; but What I do claim as my invention, and desire to secure by Letters Patent, is—

1. An electric heater, comprising a heating coil imbedded in a vessel of a non-conducting material, the said heater coil ends protruding through the side of the said vessel together with the end of a perforated sheet of copper also imbedded in the said vessel.

2. An electric heater, comprising a non-absorbing, non-conducting body to be heated with a resistance element imbedded in said body, the ends of said element being brought out to form terminal connections, a perforated sheet of metal also imbedded in the said body with one end protruding through the said body, and a casing to mount and surround the said body.

3. An electric heater, comprising a heating element imbedded in a glass or porcelain body to be heated, the ends of said element protruding through the said body, means for reinforcing said body comprising a perforated sheet of metal imbedded in and extending through said body, means for mounting said body to the casing comprising a rubber gasket, bolts and nuts.

4. An electric heater, comprising a resistance element imbedded in a body of glass or porcelain, the base of said body being flanged with holes therein engaging with bolts, the ends of said element being brought out through the base of said body to provide connections, means for protection comprising a perforated sheet of copper imbedded in said body and protruding through said base to which is mounted a circuit-breaker, means for making a water tight connection between said body and said casing comprising a rubber washer and means for mounting said body to casing through holes in flanged base of said body comprising nuts and bolts.

WILLIAM MAHLON REID KAY.